United States Patent [19]

Wetterhorn et al.

[11] 4,361,046

[45] Nov. 30, 1982

[54] CALIBRATION ADJUSTMENT FOR GAUGE INSTRUMENTS

[75] Inventors: Richard H. Wetterhorn, Fairfield; William S. Kosh, Shelton, both of Conn.

[73] Assignee: Dresser Industries, Inc., Dallas, Tex.

[21] Appl. No.: 239,936

[22] Filed: Mar. 3, 1981

[51] Int. Cl.³ .............................................. G01L 7/04
[52] U.S. Cl. ...................................... 73/711; 73/740; 73/756
[58] Field of Search .................. 73/711, 741, 732–740, 73/756

[56] References Cited

U.S. PATENT DOCUMENTS

| | | | |
|---|---|---|---|
| 1,439,975 | 12/1922 | Peterson | 73/711 |
| 1,565,446 | 12/1925 | Heise | 73/732 |
| 2,141,211 | 12/1938 | Hopkins | 73/740 |
| 3,633,535 | 1/1972 | Puster | 73/739 |
| 4,109,537 | 8/1978 | Gorgens et al. | 73/741 |
| 4,168,631 | 9/1979 | Wetterhorn et al. | 73/741 |
| 4,237,738 | 12/1980 | Wetterhorn et al. | 73/740 |
| 4,240,298 | 12/1980 | Wetterhorn | 73/740 |

Primary Examiner—Donald O. Woodiel
Attorney, Agent, or Firm—Daniel Rubin

[57] ABSTRACT

An elongated actuator pin in a pressure gauge extends from a fixed end to a free end to interact with the amplifier for enabling pivotal motion thereof to translate Bourdon displacement to an output pointer. A clamp slideably mounted on the actuator pin is operatively effective when set at a selected location along the pin length to variably offset the free end of the pin from its longitudinal axis for obtaining correct calibration adjustment of the gauge.

11 Claims, 12 Drawing Figures

CALIBRATION ADJUSTMENT FOR GAUGE INSTRUMENTS

TECHNICAL FIELD

The technical field to which the invention pertains includes the art of measuring and testing as is applicable to amplifier movements for gauge instruments.

BACKGROUND OF THE INVENTION

By and large most condition response gauge instruments typically employ a condition responsive element such as bellows, Bourdon tube, bi-metal coil or the like which provides displacement in response to condition changes to which the element is sensitive. In the usual gauge of quality construction, there is employed an amplifier or "movement" comprised of leverage and gearing operably responsive to deflective motion of the condition responsive element for driving an output shaft supporting a pointer movable relative to a fixed dial plate. The dial registration opposite the pointer position is indicative of the condition state such as pressure or temperature with which the instrument is being operative. In order to obtain in-service operational accuracy of such instruments, it is a common procedure during fabrication to calibrate the instrument for a variety of factors such as span, linearity, zero, etc. Span adjustment, as is known in the art, has for its purpose to effect pointer travel coincident with the dial span contemplated by the instrument on being subject to a full range of condition values through which it is intended to operate.

Features on the gauge assembly available for enabling calibration must, of course, be compatible with the overall construction of the gauge and within any known gauge construction has been accomplished in a variety of arrangements by different manufacturers. Exemplifying calibration adjustment features of the prior art are contained in the disclosures of U.S. Pat. Nos. 4,240,298; 4,168,631; 4,109,537 and 2,141,211.

SUMMARY OF THE INVENTION

This invention relates to gauge instruments and more specifically to novel apparatus for effecting the calibration adjustment of such instruments.

In accordance herewith, the invention is applicable to a gauge instrument such as pressure gauge utilizing a Bourdon tube, an amplifier adapted to transmit displacement motion of the Bourdon tube to an output pointer and an elongated actuator pin that interacts with the amplifier to effect amplifier operation. For enabling calibration, a bending clamp is secured to the actuator pin intermediate the pin ends, one end of which is relatively fixed and the other end of which is relatively free for interacting with the amplifier. The clamp is slideably positionable along the length of the pin during which it imposes a variable bending moment against the free end of the pin causing it to incur a variable offset from the longitudinal axis of the pin. When positioned at a selected location, the clamp will produce a controlled degree of end offset corresponding to the calibration correct span adjustment for the gauge. With the clamp being of spring metal secured to the pin by a spring grip, releasing the grip enables a sliding movement of the clamp longitudinally along the pin until an approximate calibration has been obtained. By then displacing the clamp arcuately about that location, final calibration can be attained.

With the clamp being easily positioned and set in place at whatever longitudinal location is required to effect calibration, the process of calibrating can be quickly and easily attained in a reliable manner and at a relatively marginal expense as compared to other structures and techniques employed for that purpose.

It is therefore an object of the invention to provide a novel structure for enabling calibration adjustment of a gauge instrument.

It is a further object of the invention to effect the previous object with an inexpensive construction that reliably and accurately enables calibration to be effected.

BRIEF DESCRIPTION OF THE DRAWINGS

Referring now to FIG. 1, the construction thereof may, for example, be of a type disclosed in U.S. Pat. Nos. 4,168,631 and 4,237,738, in which a pressure gauge 10 has a floating amplifier 12 supported on the free end 14 of a coiled Bourdon tube 16. Pressure represented by arrow 18 is received inward of the threaded socket 20 weld connected at 21 to the Bourdon tube wherefrom the fluid pressure is transmitted inward of the Bourdon tube to effect displacement of tube end 14 in a well known manner. By virtue of amplifier 12 being mounted on tube end 14, the amplifier floats conjointly therewith for segment gear 32 to effectively drive a pinion 23 on shaft 22 supporting a pointer 24. Arcuate displacement of the pointer via rotation of shaft 22 reflects values of pressure as represented by graduations 26 on dial face 28.

Amplifier 12 may be of a type disclosed in U.S. Pat. No. 4,240,298 in which a support frame 30 is secured to the Bourdon tube end 14. In this construction segment gear 32 is hinge mounted within frame 30 on transverse cross pin 34 to interact with an elongated actuator pin 35. For that purpose the free end 36 of pin 35 is laterally positioned extending through elongated aperture 38 formed in the segment gear. The opposite end of pin 35 is anchored via welding or the like 37 to a relatively stationary portion of Bourdon tube 16. Secured to pin 35 intermediate its ends is clamp 40 for effecting span adjustment as will be described below. FIG. 2 illustrates a variation of FIG. 1 for effecting linearity or zero adjustment while the variation of FIG. 3 utilizing two clamps 40 and 40' enables the combined adjustments of FIGS. 1 and 2.

Figure 1:
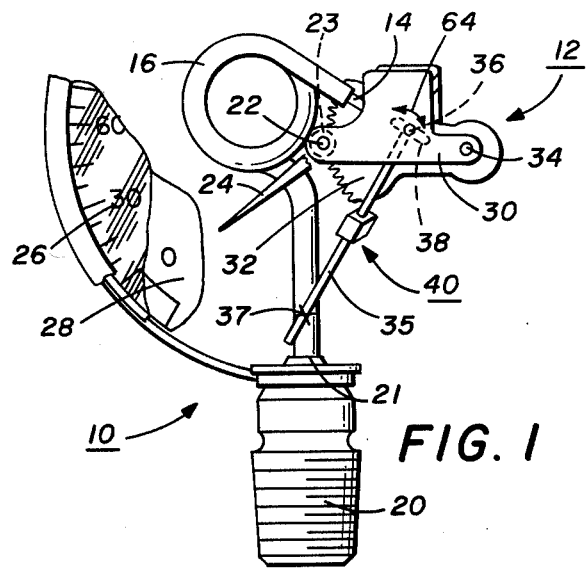
FIG. 1 is an elevation view of a first form of gauge construction with which the calibration apparatus of the invention can be utilized for effecting span adjustment.
Figure 4:
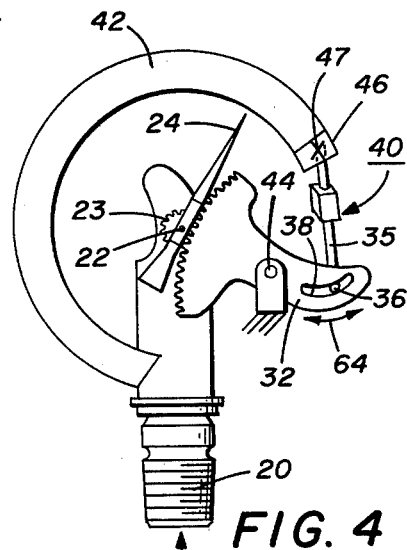
FIG. 4 is a second form of gauge construction with which the calibration apparatus of the invention can be utilized for effecting span adjustment.
Figure 5:
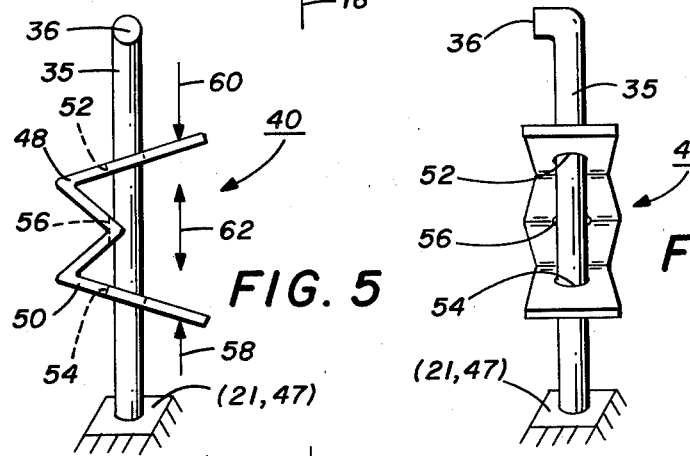
FIGS. 5 and 6 are enlarged side and front elevations, respectively, of a first clamp embodiment for effecting claibration in accordance herewith.
Figure 6:
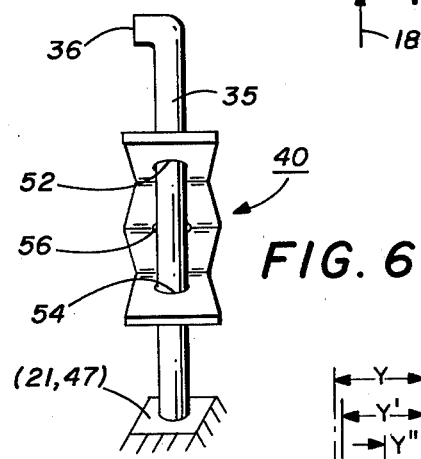

In the gauge embodiment of FIG. 4, inlet pressure represented by arrow 18 is similarly supplied through socket 20 to a C-shaped Bourdon tube 42. Segment gear 32 is pivotally supported on anchored pin 44 while the segment tail is connected by means of actuator pin 35 to the free end 46 of the Bourdon tube via weld 47 thereat. Displacement of free end 46 produces a pivotal movement of segment gear 32 to in turn drive pinion 23 for operating pointer 24 as above. A clamp 40 secured to actuator pin 35 at a selected longitudinal location thereon enables span adjustment to be effected.

Figure 7:
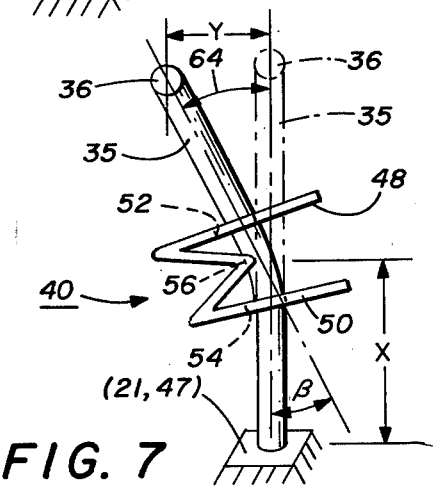
FIGS. 7 and 8 are operational diagrams for the clamp structure of the first embodiment.

Referring now to FIGS. 5–8, clamp 40 in accordance with a first embodiment comprises a W-shaped clamp which can be of either thin gauge spring metal or preferably springless metal formed in place. The clamp includes side legs 48 and 50 containing transverse apertures 52 and 54, respectively. Formed through the intermediate vertex is a more or less symmetrical aperture 56 that cooperates with apertures 52 and 54 when installed on pin 35 for defining a three point loading. The loading imposes a selected bending moment to the free end 36 of pin 35 causing an offset of the free end through an angle $\beta$. By collapsing legs 48 and 50 toward each other via use of a tool (not shown) as represented by arrows 58 and 60 at any selected longitudinal location "X" along pin 35, the angle $\beta$ is caused to increase from the unbent axis of pin 35 as represented by arrow 64 (FIG. 7). Subsequent adjustment can be accomplished by rotating clamp 40 in the direction of arrow 66 (FIG. 8) about the axis of pin 35 to functionally rotate the bending plane of the pin.

Figure 8:
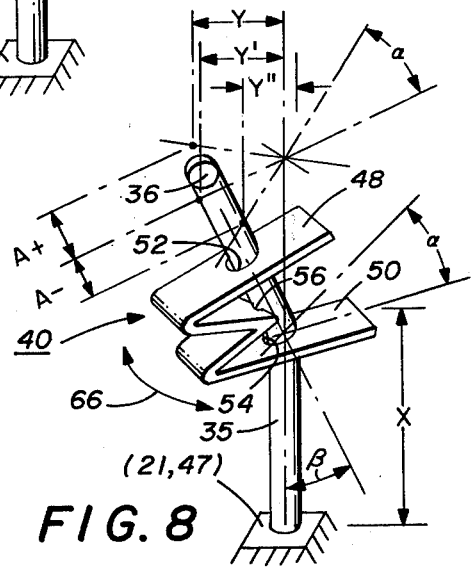
Figure 2:
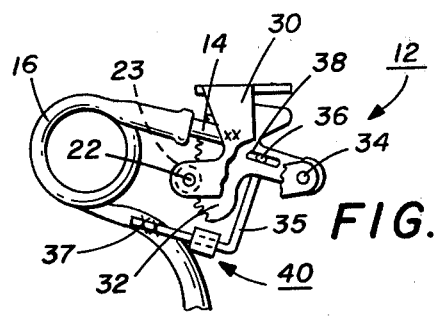
FIG. 2 is a fragmentary variation of FIG. 1 for effecting linearity or zero adjustment.
Figure 3:
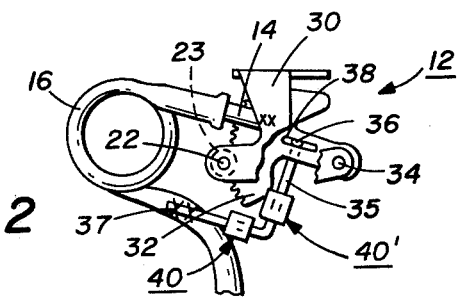
FIG. 3 is a fragmentary variation of FIG. 1 for effecting the combined adjustments of FIGS. 1 and 2.
Figure 9:
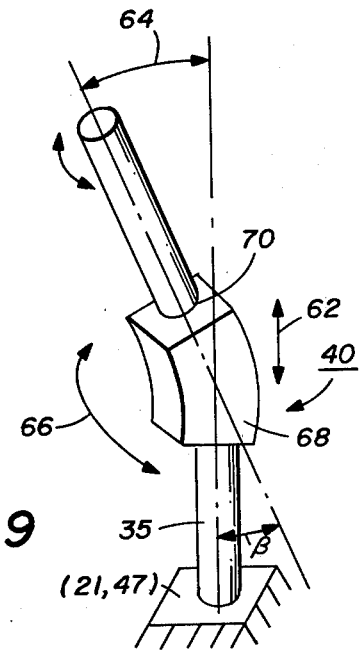
FIGS. 9-12 are individual alternative embodiments of the clamp structure hereof.

As shown in FIGS. 7 and 8 a number of offset displacements or combinations of motions can be utilized. Arc 64 or distance Y can be controlled by either varying the bend through the clamp or the center point of application X or both. Further and finer adjustment can be accomplished when clamp is subsequently rotated through an angle $\alpha$ such that distance Y to Y' will vary by the cosine of $\alpha$. Another approach utilizes the sine of angle $\alpha$ shown as $\pm A$. In this arrangement the clamp bend and the distance X are chosen to provide a range and sensitivity of A for acceptable pivotal and rotational angles $\beta$ and $\alpha$, respectively. Different types of adjustment, i. e. span, linearity, zero, etc. can be accomplished by the direction which the displacement of end 36 interacts with amplifier 12.

Figure 10:
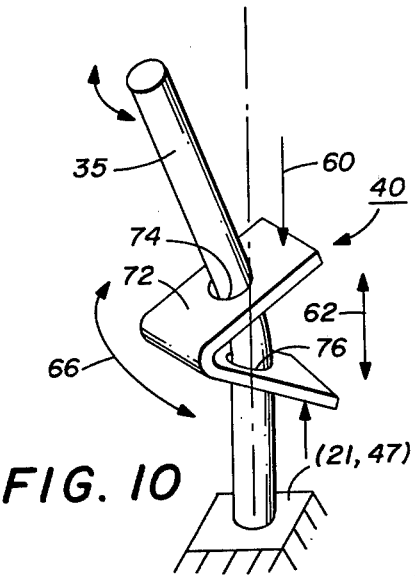
Figure 11:
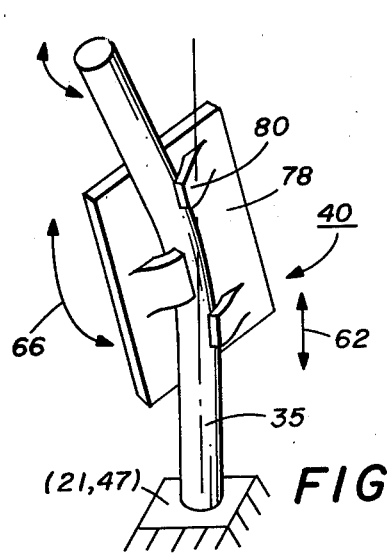
Figure 12:
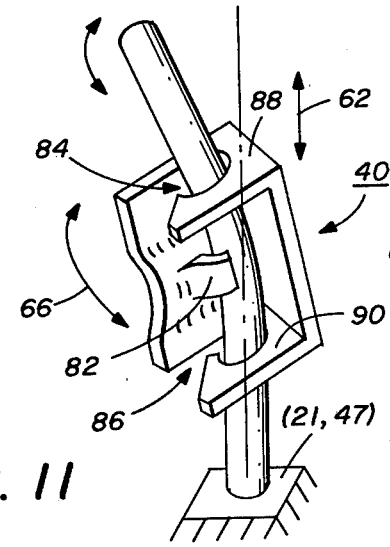

Alternative embodiments of clamp 40 for effecting similar results as above are illustrated in FIGS. 9–12. The embodiment of FIG. 9 utilizes an arcuate block 68 having an arcuate thrubore 70 for slideable movement over pin 35 either in the longitudinal direction of arrow 62 or in the rotational direction of arrow 66. In FIG. 10, the embodiment is in the form of a sheet metal V-shaped hinge 72 having transverse apertures 74 and 76 enabling it when its ends are squeezed together to be longitudinally slideable in the direction of arrow 62 and rotationally positioned in the direction of arrow 66. Optionally, the hinge can be positioned with legs parallel and then spread to a set position followed by rotation in direction 66. The clamp embodiment of FIG. 11 utilizes a plate 78 with spaced tabs 80 effecting an offset bend of pin 35 when snapped onto the pin and positioned in direction 66. In FIG. 12, clamp 40 is formed as a saddle with an inclined approach 82 adapted for a snap-on fit via open ends and apertures 84 and 86 in end walls 88 and 90, respectively.

In operation, calibration adjustment in accordance herewith is obtained by positioning a clamp 40 on pin 35 at a location intermediate its ends. By then longitudinally displacing the clamp, bending moment 64 incurs a gradual change such that clamp displacement is continued until an approximate offset Y is achieved at a selective distance X. The clamp is then arcuately displaced in the manner of arrow 66 until an accurate offset Y' is obtained. When completed, the sought calibration will be achieved. In the case of span, the travel of pointer 24 will be coincident with the dial span encountered by the instrument over the full range of pressures for which the gauge is intended to operate.

By the above description there has been disclosed novel apparatus for calibrating a gauge instrument. The apparatus is simple to operate, inexpensive to manufacture, yet highly accurate in enabling calibration of the gauge to be obtained. By the simple task of positioning the clamp hereof on the actuator pin at a selected longitudinal distance X from its anchor point, the adjustment can be approximately set and then more accurately set by merely rotating the clamp about its X location until total adjustment is achieved. By means of an apparatus which is both simple in structure and simple to operate, calibration can be obtained in a highly efficient manner as compared to prior calibration apparatus known in the art.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a gauge instrument including a Bourdon tube, an amplifier adapted to transmit displacement motion of the Bourdon tube to an output drive and an elongated actuator pin extending from between a first end secured to a support and a second end interacting with the amplifier for enabling operational motion of the amplifier in response to displacement changes incurred by the Bourdon tube, calibration apparatus comprising clamp means mounted on said actuator pin intermediate its ends and settable for imposing a controlled bend in said pin offsetting the second end thereof from a plane of the unbent pin thereat.

2. In a gauge instrument according to claim 1 in which said clamp means includes positioning means operative to enable positioning said clamp means at a selected longitudinal location on said pin for controllably setting the extent of offset bend incurred by said second pin end.

3. In a gauge instrument according to claim 2 in which said amplifier is mounted on said Bourdon tube for displacement conjointly therewith and said second end of said actuator pin defines an operative pivotal axis for said amplifier.

4. In a gauge instrument according to claim 2 in which the first end of said actuator pin is secured on the displacement end of said Bourdon tube for incurring displacement motion therewith.

5. In a gauge instrument according to claims 2, 3 or 4 in which said positioning means also enables said clamp means to be arcuately displaceable about said selected longitudinal location for gradually varying the extent of said offset bend.

6. In a gauge instrument according to claims 2, 3 or 4 in which said clamp means comprises a spring metal releasably secured on said actuator pin.

7. In a gauge instrument according to claims 1, 2, 3 or 4 in which said clamp means comprises a substantially springless composition capable of being shaped in place on said actuator pin for imposing said bend.

8. In a gauge instrument according to claim 7 in which said clamp means is operative to calibrate the span setting of the instrument.

9. In a gauge instrument according to claim 7 in which said clamp means is operative to calibrate the linearity setting of the instrument.

10. In a gauge instrument according to claim 7 in which said clamp means is operative to calibrate both the span and linearity settings of the instrument.

11. In a gauge instrument according to claim 7 in which said clamp means comprises a W-shaped clamp imposing a three point bending force against said actuator pin.

* * * * *